May 7, 1935.  C. C. FRANTZ  2,000,384
METHOD OF BAKING BREAD
Filed Aug. 13, 1934

Inventor
Charton C. Frantz

By J. Kaplan
Attorney

Patented May 7, 1935

2,000,384

UNITED STATES PATENT OFFICE 2,000,384

METHOD OF BAKING BREAD

Charton C. Frantz, Pittsburgh, Pa.

Application August 13, 1934, Serial No. 739,676

4 Claims. (Cl. 107—54)

This invention relates to food-stuffs and has special reference to the baking of bread.

More particularly the invention relates to the preparation of bread dough for baking.

In the preparation of loaf bread and the like it is customary to weigh out the dough in equal masses each being adapted to form a loaf. These dough masses are proofed for five to twelve minutes to be raised after which they are molded, cut or slit and panned.

It has been found, for certain types of bread, that it is desirable to form such masses of dough of considerable length in proportion to their cross-section and to twist two or more such masses together before placing in a pan and baking. However, where two or more such masses are proofed separately the formation of the before mentioned skin prevents proper adhesion and interferes with the proper lightness and grain of the baked loaf.

One object of the invention is to provide a novel method of making such twisted loaves so as to prevent the formation of skin on the contacting faces of the loaf parts or members and thereby permit the air or gases generated during the process of baking to freely flow from one part to another in order to produce a loaf of a finer texture and closer grain than is possible with the usual methods.

A second important object of the invention is to produce a method of making a twisted loaf wherein the loaf may be made with a small fraction of the labor and time required for the manufacture of such loaves in the usual way.

Another object of the invention is to form a twisted bread consisting of two or more strips of dough in which one weighing operation for each loaf and one molding operation for each loaf are all that is necessary instead of the two weighing and molding operations now necessary to form a complete loaf.

With the above and other objects in view, the invention consists in general of the dough mass and method of forming the same hereinafter fully described and specifically claimed, the accompanying drawing being used to illustrate the construction and method of forming the dough mass and its final condition.

In the accompanying drawing like characters of references indicate like parts in the several views, and Figure 1 is an elevation of a raised or proofed dough mass as scaled or weighed to form the loaf.

Figure 1:
Figure 2:
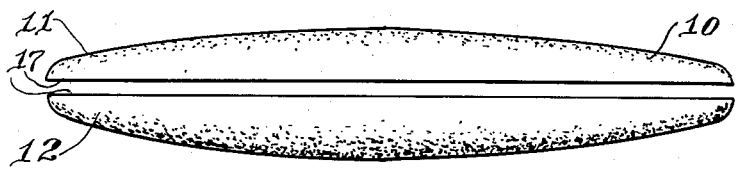
Figure 2 is a top elevation showing one method of preparing the mass for twisting.
Figure 3:
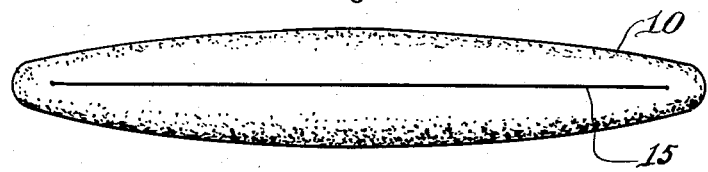
Figure 3 is a similar view showing a second method of preparing such a dough mass.
Figure 4:
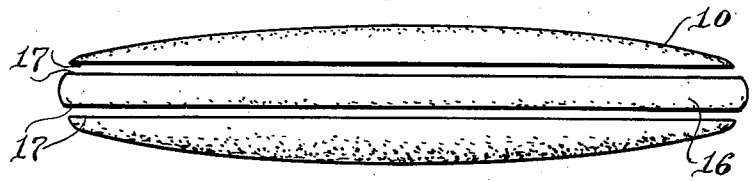
Figure 4 is a similar view showing a third method of preparing such a dough mass.

The dough in this invention is weighed or scaled out in equal masses and molded into substantially spindle shaped masses such as are shown in Fig. 1 at 10. These masses are now subjected to a first proofing and raising operation as is common in preparing dough for molding. When these masses pass through the molder a cutter is passed longitudinally through the entire loaf to separate it into two parts, 11 and 12 as shown in Fig. 2 the line of division extending longitudinally from one end of the mass to the other, or the cutter may be passed from a point near one end of the mass to a point near the other end, on a line 15, or a plurality of cutters may be passed through the mass to leave at least one thin central strip 16 as shown in Fig. 4.

Figure 5:
Figure 5 shows the appearance of such a mass as shown in Figs. 2 and 3 when twisted.
Figure 6:
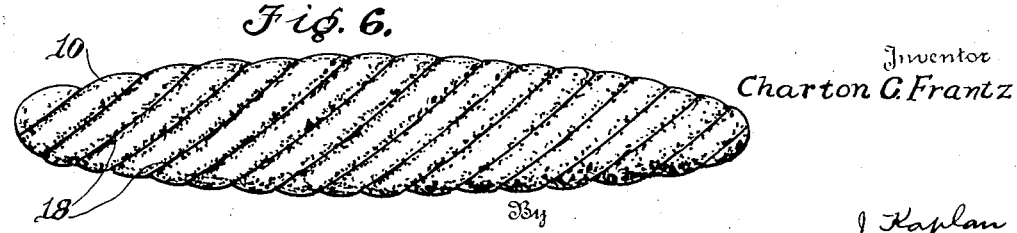
Figure 6 shows the appearance of such a mass as shown in Fig. 4 when twisted.

Under each of these conditions there is provided freshly cut proximal surfaces 17 so that in the mass, when twisted as in Figs. 5 and 6, these freshly cut surfaces are held together in a helical formation as at 18. It is to be noted that this twisting is done immediately after the cutting and before any non-adhering skin is formed on the freshly cut surfaces.

Thus, when the twisted mass is subjected to the baking operation no skin exists between the parts on opposite sides of the cut or cuts and the air or gases generated during the process of baking can freely blow from one part to the other part without any hindrance as would be the case were the skin present. The result is that the baked loaf made under these conditions has a finer and closer texture than the present loaves. Moreover, one weighing operation for each loaf and one molding operation for each loaf are all that is necessary instead of the two weighing and molding operations necessary to form a complete loaf in the usual manner.

Thus the method reduces to great simplicity the process of forming such loaves.

It is obvious that changes may be made in this method and in the article formed thereby without departing from the material principles involved. It is not therefore desired to confine this invention to the exact method and article herein described but it is desired to include all such as come within the scope of the appended claims.

What is claimed is:—

1. In a method of preparing dough for baking, the process of weighing out dough masses, first proofing and raising said masses, moulding then slitting said masses longitudinally after moulding, and thereafter twisting said masses with the raw surfaces in proximation.

2. In a method of preparing dough for baking, the process of weighing out dough masses, first proofing and raising said masses, moulding then slitting said masses longitudinally after moulding, and thereafter twisting said masses with the raw surfaces in proximation, the slits in said masses extending from end to end of each mass.

3. In a method of preparing dough for baking, the process of weighing out dough masses, first proofing and raising said masses, moulding then slitting said masses longitudinally after moulding, and thereafter twisting said masses with the raw surfaces in proximation, the slit extending from a point spaced from one end to a point spaced from the other end.

4. A method of preparing a bread loaf which consists of cutting a mass of dough into two portions, pressing the freshly cut surfaces together, twisting the two portions and baking the twisted mass.

CHARTON C. FRANTZ.